United States Patent Office 3,476,714
Patented Nov. 4, 1969

3,476,714
BIAXIALLY ORIENTED POLYPIVALOLACTONE FILM
Erhard F. Hoegger, Wilmington, Del., assignor to E. I. du Pont de Nemours and Company, Wilmington, Del., a corporation of Delaware
No Drawing. Filed Apr. 20, 1964, Ser. No. 361,234
Int. Cl. C08g 17/02
U.S. Cl. 260—78.3        1 Claim

ABSTRACT OF THE DISCLOSURE

Melt fabricated films of polypivalolactone can be rendered tough, clear, transparent and drawable by rolling biaxially to produce biaxial orientation.

DESCRIPTION OF THE INVENTION

This invention relates to a linear polyester film and its preparation. More specifically, the invention relates to a self-supporting film of polymerized hydroxypivalic acid or its esters.

High molecular weight polypivalolactone, sometimes named polyhydroxypivalic acid depending on the monomer employed to prepare the polymer, has been prepared from monomeric hydroxypivalic acid (alternatively named α,α-dimethyl-β-hydroxypropionic acid), from its esters or from pivalolactone. See for example, U.S. Patent 2,658,055 issued to T. Alderson. Regardless of the monomer used, the structural formula of the polymeric product is the same and will be referred to herein as polypivalolactone. Fibers have been prepared from polypivalolactone by solution or melt spinning methods and can be oriented by cold drawing.

However, a self-supporting film of high molecular weight polypivalolactone cannot be drawn satisfactorily. Also, such a film has poor flexibility, transparency and toughness (see for example, French Patent 1,231,163 to Kodak-Pathé, 1960). Attempts to improve the properties of such a film by drawing result generally in elongations, before breaking, of less than 10 percent and often less than 5 percent, without improvement of the properties of the film. Consequently, the use of polypivalolactone in the past has been limited to the manufacture of fibers or plastic objects.

It is believed the poor drawability and other properties of films prepared from polypivalolactone is due to the rapid crystallization of the polymer during film formation which results in a film in which the crystallinity is substantially completely spherulitic, i.e., the film is pervaded with spherulites and shows essentially no regions of darkness when viewed with a visible light microscope using crossed Nicols. For a discussion of spherulites in crystalline polymers, see G. Schuur, J. Polymer Science, 11, 385–396 (1953) and A. Keller, J. Polymer Science, 17, 291–308 (1955).

Due to the presence of the spherulites, the film cannot be oriented, in an attempt to improve its properties, by drawing, i.e., stretching with permanent elongation, because the maximum elongation obtained is less than 10 percent even at temperatures close to the melting point of the polymer. In addition, presence of the spherulites appears to account for the lack of toughness, flexibility and clarity of the film.

It is an object of this invention to provide a biaxially oriented film prepared from hydroxypivalic acid, its lactone or esters, which is crystalline, transparent, clear, tough, flexible, and drawable. Another object is to provide such a film that is essentially non-spherulitic. These and other objects will more clearly appear hereinafter.

The novel polypivalolactone film of this invention is a clear, transparent, drawable, tough, biaxially oriented, highly crystalline and essentially non-spherulitic film. It is composed of a polymer having recurring units of the formula —$CH_2$—$C(CH_3)_2$—$COO$— and having an inherent viscosity (as defined by L. H. Cragg in Journal of Colloid Chemistry, 1, 261–9, 1946) greater than 1.5 as measured at 0.5 percent concentration in trifluoroacetic acid at 30° C. This corresponds to a molecular weight higher than 40,000.

The term "clear" is defined herein as meaning substantially unclouded, i.e., free from blotch.

The term "transparent" is herein defined as the property of transmitting light so that bodies can be seen through.

The term "drawable" as used herein is defined to mean the film can be stretched with permanent elongation to at least 100% in at least one direction (the direction in which the film is rolled or the transverse direction).

The term "tough" is defined herein as meaning the film has a work-to-break value of at least 2.0 kg.cm./mm.$^2$, and preferably at least 10 kg.cm./mm.$^2$ in at least one direction.

By the expression "biaxially oriented," it is meant herein that the crystallites in the film are oriented in two axial directions. The biaxial orientation of the crystallites is indicated by orientation angles of from 10° to 60° at the $2\theta = 11.5°$ reflection in two directions normal to each other in the plane of the film, when viewed with an X-ray beam normal to the film.

By "highly crystalline" is meant that the polymer has an X-ray crystallinity, as defined below, of at least 50%. The crystallinity, in percent, is determined in the following way: The film sample is mounted on a flat surface and an X-ray reflection pattern is recorded via a goniometer scan starting from $2\theta = 3°$ to $2\theta = 32°$. On the graph, a baseline is first established by drawing a straight line from the lowest point ont he curve between $2\theta = 3°$ and $2\theta = 9°$ to the curve point at $2\theta = 32°$. Then a line is drawn by one familiar with X-ray techniques on polymers to enclose that portion of the reflection curve which can be attributed to the amorphous regions of the polymer (this line is hereafter referred to as "amorphous curve").

Vertical lines are then drawn from curve points to the baseline at $2\theta = 9.0°$, 13.5°, 16.4°, and 20.0°, respectively. Using a planimeter, the following areas are then determined: $C_1$ inscribed by the curve, the verticals at $2\theta = 9.0°$ and 13.5° and the "amorphous curve"; $C_2$ inscribed by the curve, the verticals at $2\theta = 16.4°$ and 20.0° and the "amorphous curve"; $T_1$ inscribed by the curve, the verticals at $2\theta = 9.0°$ and 13.5° and the baseline; and $T_2$ inscribed by the curve, the verticals at $2\theta = 16.4°$ and 20.0° and the baseline. The "crystallinity" is then computed the following way:

$$\frac{100(C_1+C_2)}{(T_1+T_2)}$$

The expression "essentially non-spherulitic" is defined herein as meaning that the film is free of spherulites larger than 10–20 microns in diameter, i.e., there are no spherulites present having a larger diameter.

The film of the invention is prepared from linear, highly crystalline polypivalolactone which has the recurring structure —$CH_2$—$C(CH_3)_2$—$COO$— and an inherent viscosity of at least 1.5 by (1) pressing or extruding the polymer, at its melting point or higher, into a film, and (2) subjecting the film so obtained to compressive and/or shearing forces, in the substantial absence of tensile forces, applied to the film in directions at right angles to each other in the plane of the film, until the film is essentially non-spherulitic, and is a biaxially oriented film consisting essentially of recurring units of —CH$_2$—C(CH$_3$)$_2$—COO—.

By the expression "substantial absence of tensile forces" is meant that the only tensile force applied is that incidental force arising from the application of the compressive and/or shearing force.

By subjecting the film to compressive and/or shearing forces, the spherulites of the film are broken down until the film is essentially non-spherulitic. Care must be taken to avoid the application of tensile force, for such a force will result in breakage of the film due to tearing along the spherulite interfaces. The forces may be applied by passing the film through calender rolls, in which event the only tensile force present is that supplied by the moving rollers to move the film through the machine, i.e., substantial absence of tensile forces. This produces an oriented film in which orientation is principally in the direction in which the film passes through the rolls, although some orientation at right angles to the direction of rolling occurs. The best films, however, are biaxially oriented films, i.e., films prepared by passing the film through the calender rolls at least twice, with the direction of each pass at right angles to the preceding pass, and with a minimum total reduction in film thickness of 40 percent. These biaxially oriented films exhibit fairly balanced mechanical properties in both the machine direction (direction in which the film is rolled) and the transverse direction, e.g., they have elongations (at break) ranging from 100% to 150% in both directions, and they do not crack easily on bending in either direction. In contrast, the films of the same polymer oriented primarily in one direction have elongations (at break) of 60–100% and 3–7% in machine and transverse directions, respectively, and they have a tendency to crack when bent along the machine direction.

The first step of the process may be carried out by pressing a powdered form of polypivalolactone between two hot plates to melt and shape the film and thereafter cooling the film. Alternatively, the first step may be carried out by extruding the molten polypivalolactone in conventional extrusion equipment into films of desired thickness. This second alternate is especially suited for preparing film on a large scale.

The film obtained in this first step is hazy (to the extent that it is not possible to read print through it when the film is held ¼ inch above a printed page). The film is not tough and cracks when folded over upon itself. In addition, the film is crystalline, with the crystallites substantially completely spherulitic.

The spherulitic film obtained in the first step can be oriented biaxially by subjecting it to compressive and/or shearing forces as described briefly above. This orienting step is conveniently carried out by passing the spherulitic film through heated calender rolls. The rolls are heated enough to soften the polymer but not enough to melt it. Temperatures ranging from 100° to 200° can be used. Best results are obtained by passing the unoriented film first over a warm idle roll (e.g., at 170–180° C.) before passing it through calender rolls at 170–180° C. (rolls about 10" in diameter and rotating at about 7 r.p.m. are satisfactory). The spacing of the calender rolls is adjusted so that a thickness reduction of 10% to 70% or more results for each pass of the film through the calender rolls. The passage of the film once through the rolls results primarily in monoaxial orientation, parallel to the direction in which the film passes through the rolls. However, some biaxial orientation is always induced by rolling. While a single pass of the film through the calender produces some improvement in mechanical properties of the film in the transverse direction, in comparison to the unoriented film, the best transverse properties are obtained when the film is subjected to at least two passes through the calender rolls with each subsequent pass being made at right angles to the previous one. In each pass through the calender rolls, the space between the rolls is narrowed so as to obtain a thickness reduction in the film of about 10–70% in each pass, with a minimum total reduction of film thickness of 40 percent. Biaxial roll orientation can also be carried out in one pass by means of rolls of the type described in U.S. 3,048,895.

The biaxially oriented films obtained as described above in the second step of the process of this invention are clear, transparent, strong, and tough, and are essentially free of spherulites. The marked improvement in certain of the physical properties of these biaxially oriented films are illustrated by the data in the following Table I, which also gives comparative data obtained by the same tests made on unoriented films (films obtained directly on pressing the polymer) and on mainly monoaxially oriented films (films prepared by passing the pressed films through the calender but once).

TABLE I.—PROPERTIES OF UNORIENTED, MONOAXIALLY ORIENTED, AND BIAXIALLY ORIENTED POLYPIVALOLACTONE

|  | Temperature of Test (°C.) | | | | | | | |
|---|---|---|---|---|---|---|---|---|
|  | Unoriented | | Monoaxially Oriented | | | | Biaxially Oriented | |
|  | 23° | 155° | 23° | | 155° | | 23° | 155° |
| Direction of Test | | | MD | TD | MD | TD | MD | TD | MD | TD |
| Modulus, p.s.i.×10$^{-3}$ | 270 | 95 | 300 | 350 | 100 | 150 | 300 | 300 | 120 | 120 |
| Elongation, to break, percent | 1.4 | 2.6 | 95 | 4 | 160 | 5 | 120 | 130 | 300 | 250 |
| Tensile Strength, p.s.i.×10$^{-3}$ | 3.2 | 1.9 | 20 | 7 | 9 | 3 | 11 | 14 | 7 | 8 |
| Work-to-break [1], kg. cm./mm.$^2$ | 0.10 | 0.12 | 40 | 0.7 | 40 | 0.3 | 37 | 50 | 50 | 47 |

MD=Machine Direction (Direction film passed through calender).
TD=Transverse Direction.
[1] Work-to-break=The area under the stress-strain curve; roughly a measure of toughness.

The preparation of the films of this invention is described in greater detail in the following examples.

Example 1

(A) Preparation of film of polypivalolactone by pressing: Polypivalolactone powder having an inherent viscosity of 5.5 is symmetrically heaped on a clean brass plate 20 mils thick which had been previously coated with dry soap to provide better release of the pressed film. After placing two brass shims of 10 mils thickness on opposite sides of the polymer, a similar plate is placed on top of the heap of polymer and the assembly is placed between the platens of a hydraulic press.

The platens are heated to a temperature of 230–250° C. with the upper platen 5–10° C. hotter than the lower one. The polymer powder is then melted by bringing the press platens slowly together with just enough pressure to register on the pressure gauge. As the polymer melts, the pressure decreases; however, the pressure is maintained at the same nominal value by replacement of the lost pressure for a total of 1–2 minutes. The film is then pressed at 500 lb./sq. in. or higher for another minute. The assembly of film and metal sheets is removed from the press and cooled between two thick metal plates to carry off the heat and prevent the film from bulging. When sufficiently cooled, the metal plates separate from the film with a snap and the film is then removed. The resulting film, having a thickness of 15 mils is hazy, fairly strong but it cannot be bent over on itself without cracking. The film is highly crystalline and shows 100% spherulitic character when observed through crossed Nicol prisms. Physical properties of this film pressed to 5.5 mils thickness are summarized in Table I, in the column headed "Unoriented."

(B) Preparation of biaxially oriented films of polypivalolactone: A spherulitic film of 25 mils thickness is obtained as described in Part A by pressing in the hydraulic press with shims of 20 mils thickness between the metal plates. This film is warmed on an idle roll maintained at 170–180° C. in a calender and then rolled through two calender rolls, each 10″ in diameter and rotating at 7 r.p.m., heated at 170–180° C., with the spacing of the two calender rolls adjusted so that a film of approximately 10 mils thickness results on passage through the calender. The film obtained in this way is then turned 90° in the plane of the film and passed through the calender rolls again after reducing the distance between the rolls so that after this second pass the film has a thickness of 3.0 mils. The resulting film has the physical properties listed under the column headed "Biaxially Oriented" in Table I. The film is clear and tough, has a smooth surface, and is free of spherulites. X-ray analysis of the film shows the following $2\theta$ angles of reflection: three main peaks at 11.45°, 15.4° and 17.9°, respectively, and three secondary peaks at 21.4°, 23.2° and 25.0°, respectively.

Example 2

(A) Preparation of film of polypivalolactone by pressing: Polypivalolactone powder having an inherent viscosity of 5.7 is pressed into a film of 24 mils thickness by the procedure of Example 1–A. The film is hazy, spherulitic, stiff and prone to cracking on folding.

(B) Preparation of biaxially oriented film: The film of Part A is passed through calender rolls at 170–180° C., set so that the emerging film is about 15 mils thick. After trimming off the uneven edges and rotating 90° in the plane of the film, the film is passed again through the calender rolls but with the rolls set closer together so that the emerging film is 8 mils thick. This film is passed through the rolls four more times, each time the film being trimmed and rotated and the space between the rolls being reduced slightly so that the emerging film has a final thickness of approximately 4 mils. This film is very strong and clear. Narrow strips of the film can be drawn under water at 65° C. to over two times their original length, with formation of strong, stiff elastic ribbons.

Thinner films can be prepared as described above by passing two films together through the calender rolls and subsequently stripping them apart.

The polyester starting materials for the films of this invention can be prepared by various methods. A method which produces polymer of especially high quality involves polymerization of purified pivalolactone ($\alpha,\alpha$-dimethyl-$\beta$-propiolactone). The pivalolactone is dried by refluxing over powdered calcium hydride under a vacuum of about 15 mm. mercury for 15–20 hours, then distilled through a Vigreux column. The center fraction, B.P. 49° C. at 15 mm. mercury, is collected in an addition funnel and used immediately for polymerization. Polymerization is carried out with efficient stirring and under a current of dry nitrogen as follows: To a solution of pivalolactone in pure hexane (a grade of high purity commercially available for spectral uses) heated to 40° C. is added by syringe a warm (50° C.) 0.1 N solution of the tetra-n-butylammonium salts of $\alpha,\alpha$-disubstituted fatty acids having 9–11 carbons (0.01 to 0.1 mole percent of the pivalolactone) in hexane. A fine white powder precipitates immediately, whereupon external heating is removed and the polymerization is continued for two hours. At the end of the two hours polymerization time, the solid polymer is isolated, washed with ethyl alcohol and dried in vacuo at 100–120° C. The isolated polymer has an inherent viscosity, measured in 0.5% solution in trifluoroacetic acid at 30° C., of more than 1.5. By this method polypivalolactones having inherent viscosities as high as 5.5 can be obtained. An inherent viscosity of 5.5 corresponds to an approximate number average molecular weight of 225,000 (calculated by the equation $\eta_{inh}=(3.10^{-4})M^{0.8}$, where $\eta_{inh}$ is the inherent viscosity and M is the number average molecular weight).

In an alternative method for preparing polypivalolactone, the sequence of addition can be reversed. Thus, a solution of the tetra-n-butylammonium salts of $\alpha,\alpha$-disubstituted fatty acids having 9–11 carbon atoms in hexane is placed in a polymerization vessel and heated to 45° C. To this solution there is added rapidly with stirring from an addition funnel the freshly dried and distilled pivalolactone. The reaction temperature rises to 50° C. and after 10 minutes the external heat is removed. Polymerization is continued for 3 hours and the product is worked up as in the preceding paragraph. In this case, polypivalolactone obtained has an inherent viscosity of 4.24, corresponding to a number average molecular weight of 155,000.

Polyesters suitable for use in preparing the films of this invention can also be prepared by polymerizing hydroxypivalic acid of high purity (i.e., having a melting point of at least 122° C.), or the ester of such an acid with a low boiling aliphatic alcohol, as described in U.S. Patent 2,658,055. In this method, polymerization is continued until a polymer having an inherent viscosity of at least 1.5 is obtained.

The films of this invention are especially useful in those applications requiring clear, tough films that retain relatively constant tensile and electrical properties over a wide temperature range. Specific applications of this type in which the films are useful include electric motor slot liners, heavy duty wrapping film, drafting film, construction film for greenhouses, belting, strapping, and bags in which the contents are to be sterilized or boiled in the bag.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A film of biaxially oriented polypivalolactone characterized by
 (i) being free of spherulites having a diameter larger than 10–20 microns,
 (ii) a crystallinity of at least 50%,
 (iii) an elongation of at least 100%,
 (iv) an inherent viscosity greater than 1.5 measured in 0.5% solution in trifluoroacetic acid at a temperature of 30° C.
said film being the product of extruding or pressing polypivalolactone above its melting point and subjecting the film so obtained to compressive and/or shearing forces at a temperature of 100–200° C. in the substantial absence of tensile forces, said forces being applied to the film in directions at right angles to each other in the plane of the film, until the film is free of spherulites having a diameter larger than 10–20 microns.

(References on following page)

References Cited

UNITED STATES PATENTS

| | | | |
|---|---|---|---|
| 2,952,878 | 9/1960 | Swerlick et al. | 260—67 |
| 2,658,055 | 11/1953 | Alderson | 260—78.3 |
| 3,261,903 | 7/1966 | Carr | 264—210 |
| 3,328,503 | 6/1967 | Ancker | 264—175 |
| 3,354,023 | 11/1967 | Dunnington et al. | 264—175 |

FOREIGN PATENTS

| | | |
|---|---|---|
| 1,231,163 | 9/1960 | France. |
| 766,397 | 1/1957 | Great Britain. |

HAROLD D. ANDERSON, Primary Examiner

U.S. Cl. X.R.

260—96; 264—175, 210